United States Patent
Harada et al.

(10) Patent No.: US 8,887,689 B2
(45) Date of Patent: Nov. 18, 2014

(54) OIL DETERIORATION SUPPRESSING APPARATUS FOR INTERNAL COMBUSTION ENGINE

(75) Inventors: Kenichi Harada, Susono (JP); Ippei Fukutomi, Machida (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 14/004,367

(22) PCT Filed: Mar. 18, 2011

(86) PCT No.: PCT/JP2011/001635
§ 371 (c)(1),
(2), (4) Date: Sep. 10, 2013

(87) PCT Pub. No.: WO2012/127518
PCT Pub. Date: Sep. 27, 2012

(65) Prior Publication Data
US 2013/0340705 A1    Dec. 26, 2013

(51) Int. Cl.
*F01M 11/03* (2006.01)
*F16N 39/06* (2006.01)
*F01M 1/10* (2006.01)

(52) U.S. Cl.
CPC ........ *F16N 39/06* (2013.01); *F01M 2001/1007* (2013.01); *F01M 1/10* (2013.01)
USPC .................. 123/196 A; 123/196 R; 210/502.1

(58) Field of Classification Search
USPC ................... 123/196 R, 196 A; 210/502.1
See application file for complete search history.

(56) References Cited

U.S. PATENT DOCUMENTS

| | | | |
|---|---|---|---|
| 4,560,545 A * | 12/1985 | Spickett et al. | 423/430 |
| 5,069,799 A | 12/1991 | Brownawell et al. | |
| 5,225,081 A * | 7/1993 | Brownawell | 210/690 |
| 8,607,991 B2 * | 12/2013 | Lockledge et al. | 210/502.1 |
| 8,772,208 B2 * | 7/2014 | Fukutomi et al. | 508/381 |
| 2006/0260874 A1 | 11/2006 | Lockledge et al. | |
| 2006/0261004 A1 | 11/2006 | Lockledge et al. | |
| 2008/0283019 A1 | 11/2008 | Arakawa et al. | |
| 2009/0139483 A1 * | 6/2009 | Lockledge et al. | 123/196 R |
| 2012/0145113 A1 * | 6/2012 | Mordukhovich | 123/196 A |

FOREIGN PATENT DOCUMENTS

| | | | |
|---|---|---|---|
| JP | 59-15958 B2 | 4/1984 | |
| JP | 3-174207 A | 7/1991 | |
| JP | 6-73304 U | 10/1994 | |
| JP | 2008-280986 A | 11/2008 | |
| JP | 2008-540123 A | 11/2008 | |
| JP | 2009-293494 A | 12/2009 | |
| WO | 93/00416 A1 | 1/1993 | |

* cited by examiner

*Primary Examiner* — Marguerite McMahon
*Assistant Examiner* — James Kim
(74) *Attorney, Agent, or Firm* — Sughrue Mion, PLLC

(57) ABSTRACT

The present invention provides an oil deterioration suppressing apparatus for an internal combustion engine comprising an oil reservoir section for reserving oil, a filtering component and an adsorption component provided in an oil passage, and a supply device for supplying the oil in the oil reservoir section to a side upstream of the adsorption component and the filtering component. The filtering component is configured to remove unnecessary products from the oil, and the adsorption component is configured to be positioned upstream of the filtering component to adsorb a predetermined acid component in the oil. Since the apparatus can remove a predetermined acid component in the oil from the oil in the adsorption component, it is possible to suppress generation of the sludge in the filtering component, thereby suppressing the oil deterioration appropriately.

8 Claims, 5 Drawing Sheets

OIL DETERIORATION SUPPRESSING APPARATUS FOR INTERNAL COMBUSTION ENGINE

CROSS REFERENCE TO RELATED APPLICATIONS

This application is a National Stage of International Application No. PCT/JP2011/001635, filed on Mar. 18, 2011, the contents of all of which are incorporated herein by reference in their entirety.

TECHNICAL FIELD

The present invention relates to an oil deterioration suppressing apparatus for an internal combustion engine configured to suppress deterioration of oil.

BACKGROUND ART

An internal combustion engine is provided with a lubricating device to supply oil to a portion such as a sliding portion. There are some cases where this lubricating device generates sludge having a possibility of imposing various adverse influences on respective components in the internal combustion engine. The sludge is a sludged matter, and is generally generated based upon the event that a sludge precursor generated due to oxidation of oil or a sludge precursor generated based upon incomplete combustion of fuel functions as a sludge binder performing a function of binding other individuals in the oil. That is, the sludge is an unnecessary product generated due to deterioration of oil. In addition, in the internal combustion engine, various kinds of acid substances, that is, acid components tend to be easily generated based upon a blow-by gas. It is known that mixing of these acid substances with engine oil enables generation of the sludge precursor and the sludge inside the engine to be promoted. Therefore for suppressing such deterioration of the oil, various kinds of additives can generally be added to the oil.

On the other hand, such a lubricating device is generally provided with a filter for removing foreign matters such as sludge or abrasion powder from the oil. For example, Patent Literature 1 discloses a chemical filter used in a lubricating system for an internal combustion engine. According to the description of Patent Literature 1, the chemical filter can be used in a housing of an oil filter in the lubricating system for the internal combustion engine or used in a bypass portion of the oil filter to have an ion-exchange material.

In addition, Patent Literature 2 discloses a separation component for separating fuel mixed in an internal combustion engine from the engine oil. The separation component is provided with a fuel-component separation membrane, and the separation membrane is configured in such a manner that fuel is permeable but oil is not permeable, based upon a difference in a molecular size between the oil and the fuel. The fuel-component separation membrane is provided with pores each having a diameter of the degree of 0.3 to 10 nm, and is formed of a mesoporous membrane such as a zeolite membrane or a mesoporous silica membrane. Further, Patent Literature 2 discloses that the separation component is arranged inside the oil filter provided in a lubricating oil circuit including an oil pan and is arranged downstream of a filtering material incorporated in the oil filter.

Further, Patent Literature 3 discloses an oil filter provided in a lubricating oil circulation path in an internal combustion engine. The oil filter is formed of an impurity removing layer for removing impurities each having a large particle diameter, such as iron powder, from the oil and a desulfurization layer provided downstream of the impurity removing layer. The desulfurization layer is provided to remove sulfur-containing compounds from the oil. According to the description of Citation Literature 3, a mesoporous silica porous body may be used as the desulfurization layer or the powder may be used.

CITATION LIST

Patent Literature

PTL 1: Japanese Patent Laid-Open No. 2008-540123
PTL 2: Japanese Patent Laid-Open No. 2008-280986
PTL 3: Japanese Patent Laid-Open No. 2009-293494

SUMMARY OF INVENTION

The mesoporous silica is made of silica dioxide, and has one or more fine pores (mesopores). The mesoporous silica is a kind of mesoporous silicate, and is generally in a powder shape other than a case of being in a thin film shape. In addition, it is possible to trap and remove the sludge precursor in the oil by using this mesoporous silica.

However, in a case of adopting one or more mesoporous silica to remove the sludge precursor from the oil, the oil generally cannot quickly pass through the filtering component configured to include the powder-shaped or membrane-shape mesoporous silica. This is because, for example, since the powder-shaped mesoporous silica is very fine, it is not easy for the oil to quickly flow through gaps formed between the silica particles. As a result, there is a possibility that aggregation of the sludge precursor is generated in the oil reserved in the filtering component or upstream thereof to accelerate the degradation of the oil.

Therefore the present invention is made in view of the foregoing problem, and an object of the present invention is to, in a case where a filtering component is provided for removing unnecessary products expected removal from oil, such as sludge precursors, from oil to suppress deterioration of the oil, more appropriately suppress aggregation of the sludge precursor or deterioration of the oil.

An aspect of the present invention provides an oil deterioration suppressing apparatus for an internal combustion engine comprising an oil reservoir section for reserving oil, a filtering component provided in an oil passage through which the oil can flow, the filtering component being configured to remove unnecessary products from the oil, an adsorption component provided in the oil passage to be positioned upstream of the filtering component, the adsorption component being configured to adsorb a predetermined acid component in the oil, and a supply device for supplying the oil in the oil reservoir section to a side upstream of the adsorption component and the filtering component.

According to the above-mentioned configuration, since the predetermined acid component in the oil can be removed from the oil in the adsorption component, it is possible to appropriately suppress aggregation of the sludge precursor in the filtering component provided downstream of the adsorption component or near the filtering component. Therefore according to the present invention, the oil deterioration can be suppressed appropriately.

Preferably the filtering component and the adsorption component are arranged in a single oil return passage in the oil passage. More preferably the filtering component is arranged away from the adsorption component.

The filtering component may include a plurality of particulate porous silica. In addition, the filtering component may include one or more porous silica membranes. Further, the adsorption component may include one or more ion-exchange bodies.

An oil deterioration suppressing apparatus for an internal combustion engine according to an embodiment in the present invention may further be provided with a bypass passage formed to bypass the filtering component. Further the oil deterioration suppressing apparatus may be provided with a bypass valve in the bypass passage. An end of the bypass passage may be connected to a passage region between the filtering component and the adsorption component. In addition, a control means or a control device for controlling an operation of the bypass valve may be configured to control the bypass valve in such a manner that the bypass valve is open during an operation of the internal combustion engine, and to control the bypass valve in such a manner that the bypass valve closes when the internal combustion engine is stopped, and the supply device may be supplies the oil in the oil reservoir section to a side upstream of the adsorption component when the internal combustion engine is stopped.

The above-mentioned, and other features and advantages of the present invention will become more apparent from the description of the following, exemplified embodiments made with reference to the accompanying drawings.

DESCRIPTION OF EMBODIMENTS

An aspect of the present invention provides an oil deterioration suppressing apparatus for an internal combustion engine. The oil deterioration suppressing apparatus may be provided with an oil reservoir section for reserving oil, a filtering component and an adsorption component provided in an oil passage through which the oil can flow, and a supply device for supplying the oil in the oil reservoir section to a side upstream of these components. The filtering component is configured to remove unnecessary products from the oil, and the adsorption component is configured to adsorb a predetermined acid component in the oil. Therefore even if it takes a long time for the oil to pass through the filtering component, the aggregation of the sludge precursor in the filtering component or in the region upstream thereof can appropriately be suppressed owing to the above configuration. In this regard, however, this apparatus may be provided with a bypass mechanism that enables the oil to escape from a side upstream of the filtering component to a side downstream thereof in such a manner as to suppress the oil to be reserved in the filtering component during the operating of the internal combustion engine. Preferably the filtering component may be configured to include a plurality of, preferably many particulate porous silica, or one or more porous silica membranes or may be configured to include both of them. In addition, preferably the adsorption component may include one or more, preferably a plurality of ion-exchangers, for example, hydrotalcites.

Figure 1:
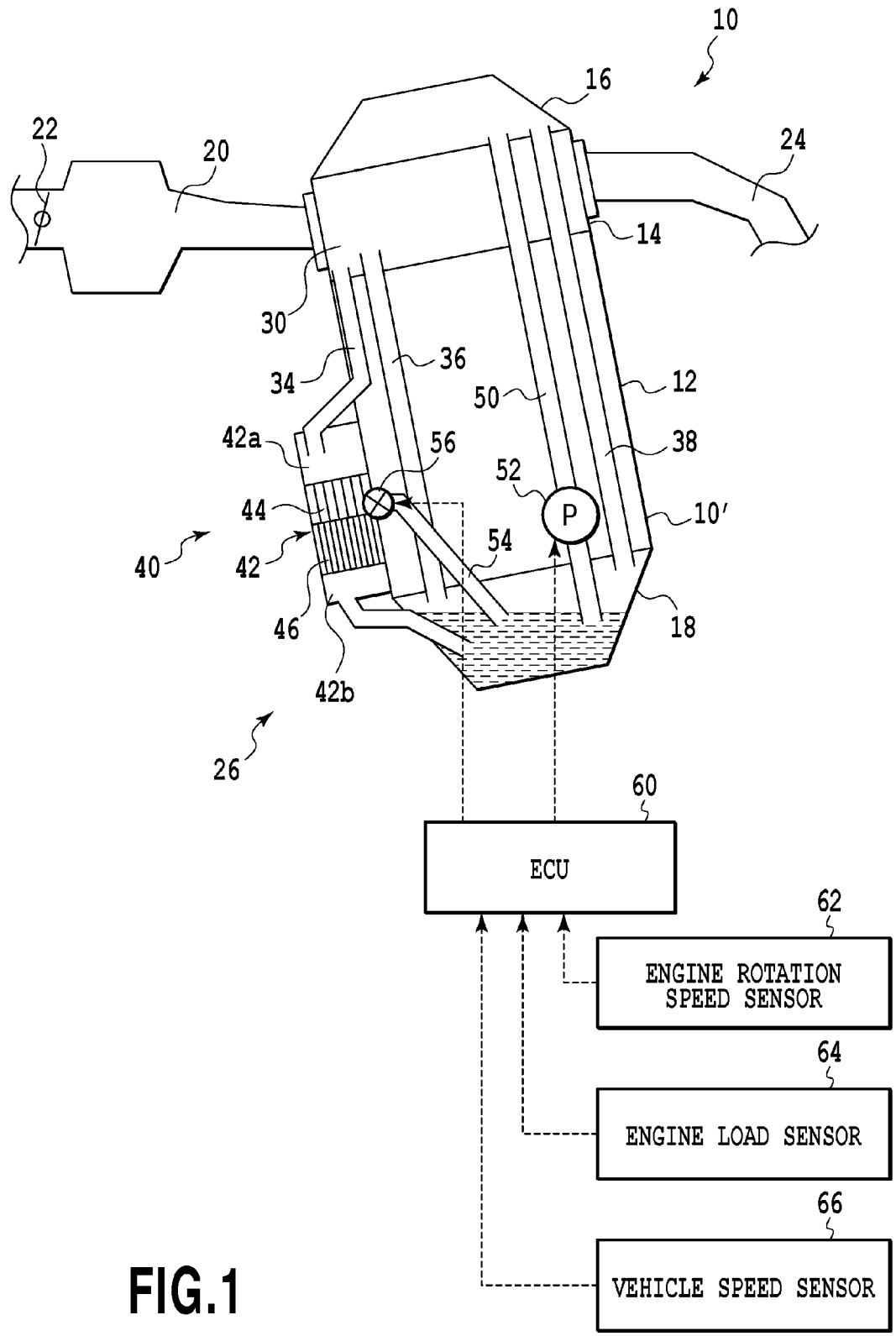
FIG. 1 is a schematic diagram of an internal combustion engine to which a first embodiment in the present invention is applied.

Hereinafter, an explanation will be made of an internal combustion engine 10 (hereinafter, called an engine) to which an embodiment in the present invention is applied. FIG. 1 schematically shows the engine 10. Herein the engine 10 is mounted on a vehicle. In this regard, however, the engine 10 in the present embodiment is an engine of an in-line four-cylinder type, but an engine to which the present invention is applied may be an engine of not only any cylinder number and any cylinder arrangement type, but also a spark ignition type engine or a compression ignition type engine.

The engine 10 comprises a cylinder block 12 provided integrally with a crank case, a cylinder head 14, a head cover 16 covering the cylinder head 14 from above, and an oil pan 18. A mixture of air taken in via a throttle valve 22 in an intake passage 20 and fuel injected from a fuel injection valve burns in a combustion chamber, and an exhaust gas thereof is discharged via an exhaust passage 24.

A lubricating device 26 in the engine 10 is configured to supply oil to a plurality of supply portions including a plurality of sliding portions in the engine 10. A part of the lubricating device 26 is diametrically illustrated in FIG. 1, and a part of the lubricating device 26 is more diametrically illustrated in FIG. 2. Hereinafter, the engine 10 and the lubricating device 26 will be explained with reference to FIG. 1 and FIG. 2.

The lubricating device 26 is provided with a strainer (not shown) and an oil pump 28, and oil reserved in the oil pan 18 as an oil reservoir section is pumped up (suctioned) by the oil pump 28 via the strainer. In this regard, the pump 28 is configured to be mechanically driven by receiving power from a cam shaft or a crank shaft, and is provided with a relief valve 29 to release the oil to a side of the oil pan 18 at a high hydraulic pressure.

Figure 2:
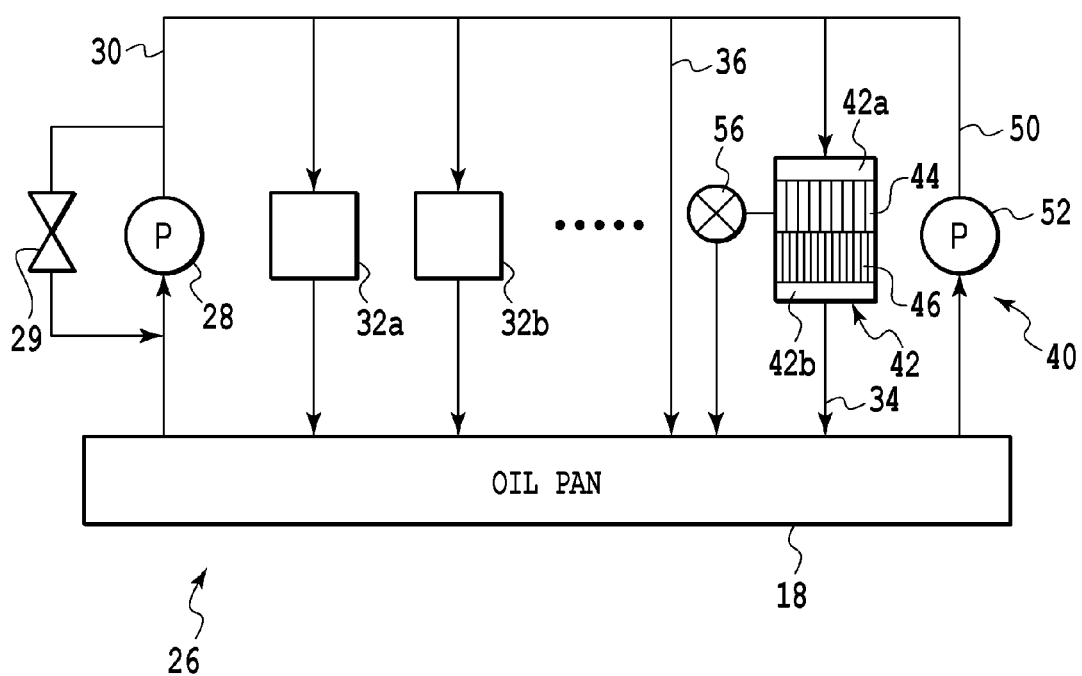
FIG. 2 is a schematic diagram of a lubricating device in the internal combustion engine in FIG. 1.
Figure 3:
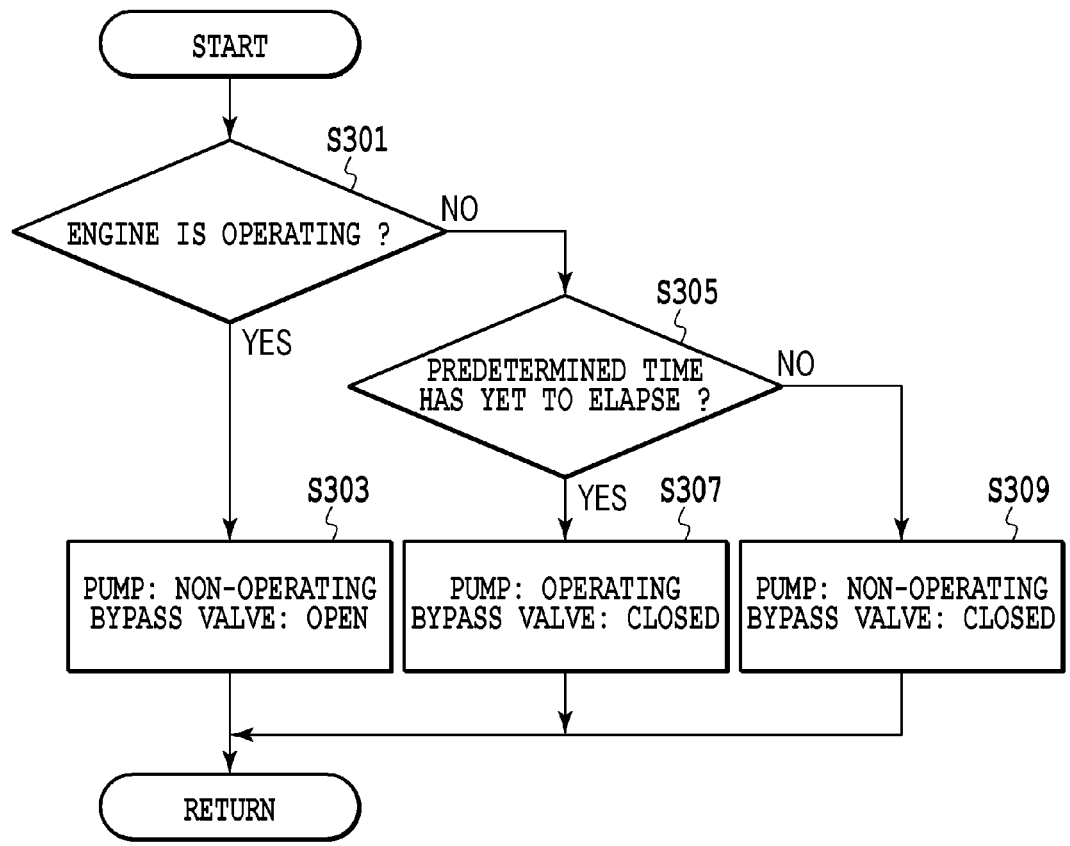
FIG. 3 is a diagram to explain operation control of a bypass valve and a pump in the internal combustion engine in FIG. 1.

The oil pumped up by the oil pump 28 as described above is supplied to components 32a and 32b, and the like in the engine 10, for example, a cam shaft journal, a crank journal, a connecting rod, and a piston via an oil filter not illustrated in FIG. 1 and in FIG. 2 through an oil passage 30 (including a plurality of oil passages corresponding to the respective supply components) formed in the engine 10. The lubricating oil, that is, the oil supplied to the plurality of the components in this way finally returns back to the oil pan 18 by its self-weight. The oil is thus circulated in the lubricating device 26. It should be noted that a space in which the oil can thus flow in the engine 10 is herein called "oil passage".

Oil return passages 34 and 36 are formed in the cylinder block 12 and the cylinder head 14 in such a manner as to establish communication between an inside of the head cover 16 or an inside of the cylinder head 14 and an inside of the crank case, that is, an inside of the oil pan 18. The oil return passages 34 and 36 are passages for returning (dropping), for example, the oil having finished the lubrication of a valve train from the cylinder head 14 toward the inside of the oil pan 18. In addition, an air passage 38 is formed to establish connection between the inside of the crank case, that is, the inside of the oil pan 18 and the inside of the head cover 16 or the inside of the cylinder head 14. The air passage 38 also has a function of upward moving the blow-by gas in the crank case toward the inside of the head cover 16. In this regard, however, the oil return passages 34 and 36, and the air passage 38 can respectively function as oil passages, and can also function as air passages. It should be noted that the number of the oil return passages 34 and 36, and the number of the air passages 38 respectively may be set to any number.

Here, the blow-by gas means a gas that leaks out into the inside of the crank case from a gap between a piston ring of a piston and a cylinder bore of the cylinder block 12. This blow-by gas contains a great deal of hydrocarbons and water components. Therefore too many blow-by gases cause quicker deterioration of the engine oil or rust of an internal part of the engine. In addition, since the blow-by gas contains the hydrocarbon, it is not preferable environmentally to release the blow-by gas into an atmosphere as it is. Therefore the engine 10 is provided with a known blow-by gas circulation device (not shown). The blow-by gas is introduced into the head cover 16, and thereafter is forcibly returned back to an intake system by using an intake negative pressure to be supplied into the combustion chamber.

Incidentally, for example, NOx, SOx, and water components are contained in the blow-by gas. In addition, for example, since heat from the engine is hard to be transmitted to the head cover 16 and the head cover 16 is exposed to outside air at an outer surface thereof to be cooled by cooling wind or the like, condensed water due to dew condensation or the like tends to be easily generated on the inner surface of the head cover 16. Therefore, particularly in the head cover 16, due to the reaction thereof, acid substances, for example, nitric acid and sulfuric acid tend to be easily generated. These acid substances can be mixed with the lubrication oil, that is, the engine oil to accelerate generation, adhesion, and accumulation of the sludge precursor and the sludge in the engine.

The sludge is generated based upon the event that a sludge precursor generated due to oxidation of oil or a sludge precursor generated based upon incomplete combustion of fuel functions as a sludge binder performing a function of binding other individuals in the oil. The sludge is generated due to deterioration of oil, and further causes the deterioration of the oil. Therefore suppression of generation or the like of the sludge precursor and the sludge brings in suppression of deterioration of the oil.

Therefore an oil deterioration suppressing apparatus 40 applied to the engine 10 has an oil filter 42 to remove such acid substances, that is, the acid component and the sludge precursor from the engine oil. The oil filter 42 is provided in the oil passage 30. Here, particularly the oil filter 42 is provided in the oil return passage 34 of the oil passage.

In this regard, however, in FIG. 1, for illustrating a primary part of the oil deterioration suppressing apparatus 40 including the oil filter 42 in an exaggerating manner, the oil filter 42 and a part of the oil return passage 34 are drawn outside of an engine body 10'. However, the installation position of the oil filter 42 and the like are not limited to the position illustrated in FIG. 1, and can be changed to various locations. For example, the oil filter 42 can be positioned to a portion making contact with an outside of each component in the engine body 10', to a portion away from the outside thereof or to an inside of each component in the engine body 10'. In this regard, however, in the present embodiment, the oil filter 42 is provided to be replaceable, and is position in a position of being easy for replacement.

The oil filter 42 is herein positioned along the way of the oil return passage 34, and defines and defines a part of the oil return passage 34. An adsorption member 44 as the adsorption component and a filtering member 46 as the filtering component are serially arranged in the oil filter 42 in order from the upstream side. That is, the adsorption member 44 and the filtering member 46 are arranged in the single oil return passage 34. Since the oil deterioration suppressing apparatus 40 is configured such that the oil can flow in the oil filter 42 by its self-weight, the adsorption member 44 is positioned upwards in a vertical direction to the filtering member 46. Particularly the adsorption member 44 and the filtering member 46 make contact with each other in the oil filter 42. In addition thereto, an upstream passage region 42a is formed in an upstream end portion in the oil filter 42, and a downstream passage region 42b is formed in a downstream end portion in the oil filter 42. Therefore the oil that flows into the oil filter 42 goes to the adsorption member 44 via the upstream passage region 42a, the oil that passes through the adsorption member 44 goes to the filtering member 46, and the oil that passes through the filtering member 46 can flow in the oil pan 18 by its self-weight via the downstream passage region 42b. It should be noted that each of the upstream passage region 42a and the downstream passage region 42b is a space having a predetermined volume allowing the oil to be reserved therein.

The adsorption member 44 in the oil filter 42, as the adsorption component, is configured to adsorb predetermined acid components in the oil. The adsorption member 44 comprises a shell member as a frame member or a case member, and one or more hydrotalcites accommodated therein, herein a plurality of, preferably many hydrotalcites. The adsorption member 44 is preferably configured such that oil can mostly pass smoothly therein. The absorption member 44 herein has a plurality of flow paths each extending substantially in the flow path direction, and a predetermined amount of hydrotalcites are accommodated in the flow path. It should be noted that the adsorption member 44 is not limited to this configuration, and for example, can be provided with a case member having an accommodation component of various sizes and shapes. The hydrotalcite can be accommodated in the accommodation component. For example, the hydrotalcite may be accommodated in the accommodation component in a state where the hydrotalcite is supported by various support members of nonwoven fabrics or the like. Alternatively a member in which the hydrotalcite is supported by various support members may be used as the adsorption member 44 as it is. In addition, various kinds of hydrotalcites may be used as the hydrotalcite, for example, "$Mg_6Al_2(OH)(CO_3)_{16}$" made by Wako Pure Chemical Industries, Ltd. may be used. It should be noted that in the present invention, a reaction substance provided in the adsorption component is not limited to the hydrotalcite.

The hydrotalcite provided in the adsorption member 44 is made of an ion-exchanger (ion-exchange material), or functions as the ion-exchanger. The hydrotalcite has a function of adsorbing a predetermined ion (ion components). Specifically the hydrotalcite is used for removing nitric acid ions ($NO_3^-$) that may be generated by NOx and water in the blow-by gas, and sulfuric acid ions ($SO_4^{2-}$) that may be generated by SOx and water in the blow-by gas from the oil. It should be noted that the acid component desired to be removed from the oil by the hydrotalcite includes not only the nitric acid ion ($NO_3^-$) and the sulfuric acid ion ($SO_4^{2-}$) but also, for example, an acetate ion ($CH_3COO^-$) that may be generated based upon the blow-by gas and similarly a formate ion ($HCOO^-$) that may be generated based upon the blow-by gas. The hydrotalcite can have a function of adsorbing at least one component selected from a group containing these ions or a group consisting of these ions. It should be noted that the hydrotalcite has a function of adsorbing acid components (the above nitric acid ion and the like) contained in the oil, in the oil, and releasing negative ions instead.

The filtering member 46 in the oil filter 42, as the filtering component, is configured to remove unnecessary products from the oil. The filtering member 46 is configured in such a manner that both or either one of the sludge and the sludge precursor as the unnecessary products, preferably the sludge precursor is trapped by the filtering member 46 to be removed from the oil. The filtering member 46 comprises a shell member as a frame member or a case member, and a plurality of, preferably many mesoporous silica particles accommodated therein. It should be noted that the filtering member 46 is not limited to this configuration, and for example, can be provided with a case member having an accommodation component of various sizes and shapes. The mesoporous silica as a filtering substance may be accommodated in the accommodation component. It should be noted that the filtering substance provided in the filtering component is not limited to the mesoporous silica.

The mesoporous silica used herein is made of particulate porous silica, and specifically can have pores each having a diameter of 1 to 20 nm. The mesoporous silica provided in the filtering member 46 is respectively formed substantially in a particulate shape, and has a diameter of approximately 0.5 to approximately 100 μm. The unnecessary product containing at least one of the sludge and the sludge precursor can be trapped in the mesoporous silica particle, in the pore of the particle, in a gap between the particles, and the like.

Firstly, the oil is supplied to the oil filter 42 having the above-mentioned configuration by supplying the oil in the oil pan 18 as the oil reservoir section upstream of the oil filter 42 by the oil pump 28 as the supply device. In addition, secondly the oil is supplied to the oil filter 42 by a different second supply device.

The oil deterioration suppressing apparatus 40 is provided with the second supply device. The second supply device includes an oil pumping passage 50 included in the oil passage 30, and a second oil pump 52. The oil pumping passage 50 is communicated with the inside of the oil pan 18 and the inside of the head cover 16 in such a manner as to supply the oil in the oil pan 18 upstream of the oil filter 42. However, the oil pumping passage 50 is not limited to this configuration, and may be configured such that one end thereof is communicated with the inside of the cylinder head 14 and the inside of the cylinder block 12. The oil pumping passage 50 is configured such that the oil in the oil pan 18 is supplied upstream of the oil filter 42, particularly upstream of the absorption member 44 and the filtering member 46. For example, the oil pumping passage 50 may be configured such that the oil in the oil pan 18 is directly supplied to part of the oil return passage 34 upstream of the members 44 and 46 or is directly supplied to the upstream passage region 42a in the oil filter 42. The oil pump 52 is provided in the oil pumping passage 50. The oil pump 52 herein is an electric oil pump, and is driven by power from a battery mounted on the vehicle. The oil pump 52 is controlled by an electronic control unit (ECU) 60 that operates as a control device in the engine 10. The ECU 60 has a function as a control means for controlling an operation of the oil pump 52. It should be noted that the present invention does not exclude that the oil pump 52 is formed of a mechanical type, but preferably the oil pump 52 is formed of an electric type.

In addition, the oil deterioration suppressing apparatus 40 is provided with a bypass mechanism. The bypass mechanism comprises a bypass passage 54 formed to bypass the filtering member 46, and a bypass valve 56 provided in the bypass passage 54. The bypass passage 54 is formed such that the oil can flow from a side upstream of the filtering member 46 to a side downstream of the filtering member 46. Here, the bypass passage 54 is formed such that one end thereof is communicated with a case member of the adsorption member 44 in the oil filter 42 and the other end is communicated with the inside of the oil pan 18.

In addition, the bypass valve 56 is substantially positioned in the upstream end portion in the bypass passage 54. The bypass valve 56 is an electromagnetic control valve, and is controlled by the ECU 60. The ECU 60 has a function as a control means for controlling an operation of the bypass valve 56, and outputs an operation signal to an actuator for drive of the bypass valve 56.

The engine 10 is provided with the ECU 60 as the control device. The ECU 60 is configured of a microcomputer including a CPU, a ROM, a RAM, an A/D converter, an input interface, an output interface and the like. The input interface is connected electrically to various sensors including an engine rotation speed sensor 62 for detecting an engine rotation speed, an engine load sensor 64 for detecting an engine load, a vehicle speed sensor 66 and the like. For example, a crank angle sensor may be used as the engine rotation speed sensor 62. In addition, an air flow meter, an accelerator opening degree sensor or the like may be used as the engine load sensor 64. The ECU electrically outputs operation signals (drive signals) to a fuel injection valve, an actuator for the throttle valve 22, an actuator for the bypass valve 56, the pump 52, and the like from the output interface such that a smooth drive or operation of the engine 10 can be performed according to preset programs based upon output (detection signals) from these various sensors.

Next, an explanation will be made of the operation control of the pump 52 and the bypass valve 56 with reference First, the ECU 60 determines whether or not the engine is operating (step S301). This determination is herein made based upon an engine rotation speed detected based upon output of the engine rotation speed sensor 62. In this regard, however, this determination may be made based upon the output of at least one of the sensors 64 and 66, and the other sensor. When the engine is driving, that is, operating, the engine rotation speed is not zero. Accordingly, at this time the ECU 60 determines that the engine is operating (positive determination at step S301), and controls the operations of the pump 52 and the bypass valve 56 in such a manner as to stop the operation of the pump 52 and open the bypass valve 56 (step S303).

On the other hand, the ECU 60, when the engine 10 transfers from the drive state, that is, the operation state to the stop state, specifically when the engine rotation speed becomes zero, determines that the engine is not operating (negative determination at step S301), and thereafter, determines whether or not a predetermined time has yet to elapse (step S305). Here, the time as a determination target is the time that elapses from a point of time when the engine rotation speed becomes zero, and is counted by a time counting means incorporated in the ECU 60. A predetermined time as a determination reference is the time required for pumping up a predetermined amount of oil via the oil pumping passage 50 by driving the pump 52 when the engine stops, and is predetermined to be stored in the ROM. However, this predetermined time may be changeable. For example, the predetermined time may be determined as the time required for pumping all of the oil reserved in the oil pan 18 when the engine stops.

In a case where the predetermined time does not elapse (positive determination at step S305), the ECU 60 controls the operations of the pump 52 and the bypass valve 56 in such a manner as to drive the pump 52 and close the bypass valve 56 (step S307). In contrast, In a case where the predetermined time has elapsed (negative determination at step S305), the ECU 60 controls the operations of the pump 52 and the bypass valve 56 in such a manner as to stop the operation of the pump 52 and close the bypass valve 56 (step S309). It should be noted that in a case where the engine restarts before the predetermined time elapses, it is determined that the engine is operating (positive determination at step S301), and the ECU 60 controls the operations of the pump 52 and the bypass valve 56 in such a manner as to stop the operation of the pump 52 and open the bypass valve 56 (step S303).

Next, an explanation will be made of the operational effect of the oil deterioration suppressing apparatus 40 in the engine 10 provided with the above-mentioned configuration.

The acid component in the oil supplied to the oil filter 42 by the operation of the pump 28 or the pump 52 can be removed in the process where the oil passes through the adsorption member 44. In addition, in the oil having passed through the adsorption member 44, the unnecessary product such as the sludge precursor is removed in the process where the oil passes through the filtering member 46. Therefore in the engine 10, the oil degradation suppressing apparatus 40 can suppress the deterioration of the oil.

Incidentally the adsorption member 44 in the oil filter 42 is designed such that the oil can mostly flow smoothly. As a result, the oil that has arrived at the oil filter 42 can pass through the adsorption member 44 without taking so much time to arrive at the filtering member 46. On the other hand, the filtering member 46 accommodates the filtering substance composed of very fine particulate substances as described above. Since the particulate substances are fine, a very narrow gap exists between the particulate substances. Therefore it is not easy for the oil to pass through the filtering member 46, and particularly when the oil is used as much as to form the sludge precursor, it is furthermore not easy for the oil to pass through the filtering member 46. Therefore in a case where the oil deterioration suppressing apparatus 40 is not provided with the mechanism for releasing the oil upstream of the filtering member 46, there is a possibility that the oil is reserved upstream of the filtering member 46, and the sludge precursors in the reserved oil aggregate therein. In addition thereto, it is preferable to appropriately circulate the oil in the oil passage 30 during the engine operating.

Therefore, as described above, in the oil deterioration suppressing apparatus 40, the bypass valve 56 is opened during the engine operating, and thereby the oil can be released from a side upstream of the filtering member 46. Accordingly, there is no possibility of occurrence of a problem that that during the engine operating, the aggregation of the sludge precursor is generated in the filtering member 46 or in the periphery thereof to generate the sludge, or the engine oil does not circulate appropriately or the like. It should be noted that at this time, since the oil can continue to pass through the adsorption member 44 in the oil filter 42, the removal of the acid component from the oil can be accelerated, thereby suppressing the degradation of the oil.

On the other hand, as described above, in the oil deterioration suppressing apparatus 40, when the engine 10 stops, the bypass valve 56 is closed and the pump 52 is driven. Therefore when the engine 10 stops, at least a part of the oil reserved in the oil pan 18 can be supplied to a side upstream of the adsorption member 44 and the filtering member 46 to flow into the members 44 and 46 in the oil filter 42. As a result, the removal of the acid component from the oil is accelerated in the adsorption member 44, and the removal of the unnecessary product from the oil from which the acid component is removed is accelerated in the filtering member 46. As a result, the event that the aggregation of the sludge precursor and the generation of the sludge occur in the oil that is once reserved upstream of the filtering member 46 is suppressed. In this way, in the oil deterioration suppressing apparatus 40, the deterioration of the oil can appropriately be suppressed.

It should be noted that in this case, since the bypass valve 56 is closed, there is a slight possibility that the aggregation of the sludge precursor occurs in the filtering member 46 or in the periphery thereof. However, when the engine 10 is started, the bypass valve 56 is opened, and the filtering member 46 and the periphery thereof are washed away by the circulating oil. Therefore even if the aggregated sludge precursor slightly exists, it can appropriately be mixed in the oil, and such aggregation can appropriately be eliminated by the function of the additive agent or the like added to the oil. Therefore the oil deterioration suppressing apparatus 40 can suppress the generation of the sludge for a long period of time.

Figure 4:
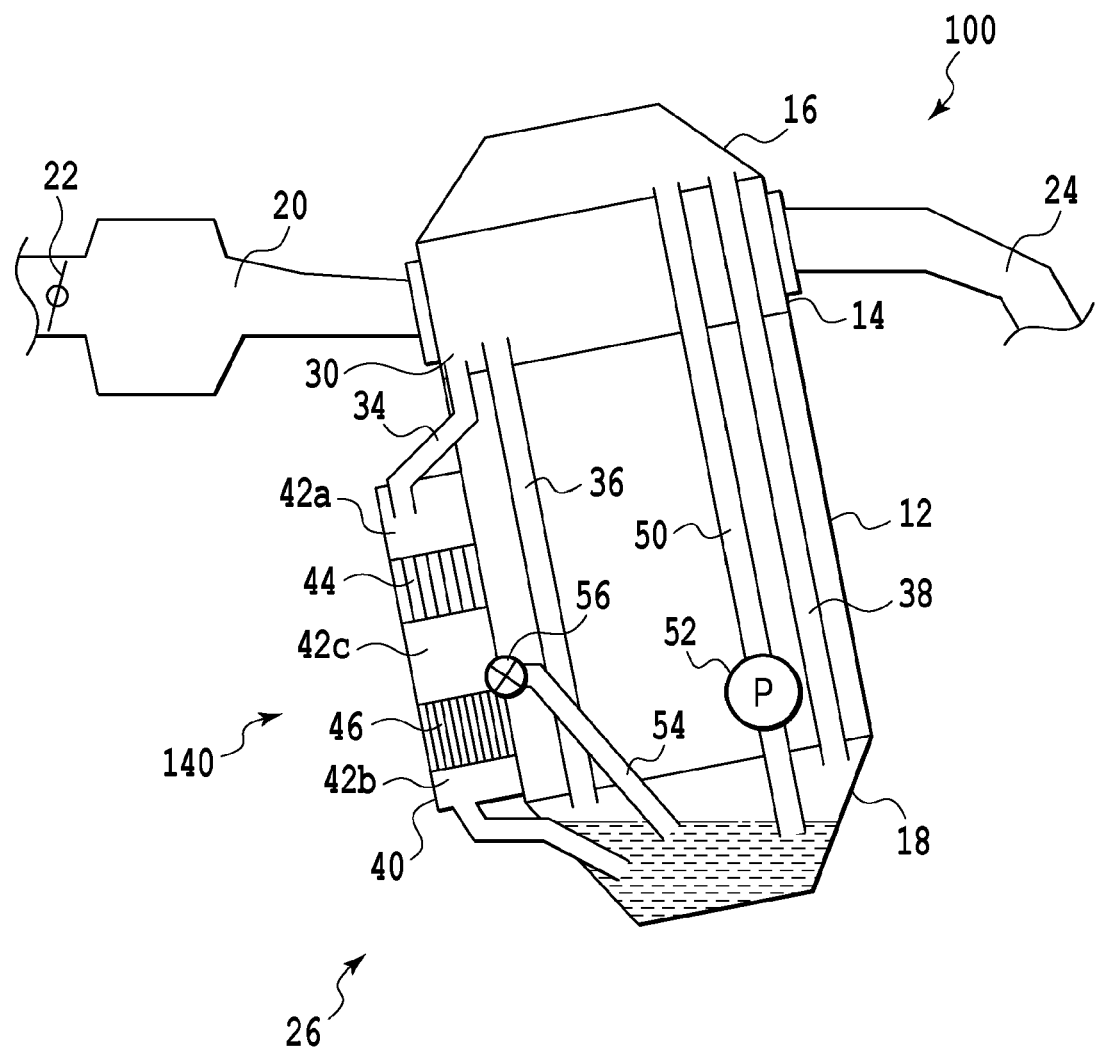
FIG. 4 is a schematic diagram of an internal combustion engine to which a second embodiment in the present invention is applied.

Next, an explanation will be made of a second embodiment in the present invention. An engine 100 to which an oil deterioration suppressing apparatus 140 according to the second embodiment is applied is conceptually illustrated in FIG. 4. It should be noted that in the following explanation, only different points from the first embodiment will be explained, and components corresponding to those in the first embodiment are likewise referred as to identical codes used in the above explanation. It should be noted that in FIG. 4, the sensors and the control device are omitted in illustration.

The oil deterioration suppressing apparatus 140 according to the second embodiment is provided with the configuration that the adsorption member 44 and the filtering member 46 are arranged away from each other, differing from the configuration of the oil deterioration suppressing apparatus 40. In addition, in relation to this, in the oil deterioration suppressing apparatus 140, the bypass passage 54 is communicated with an intermediate passage region 42c defined between the adsorption member 44 and the filtering member 46. In this regard, however, herein the bypass passage 54 is designed to be communicated with the downstream end portion of the intermediate passage region 42c.

Since the oil deterioration suppressing apparatus 140 is provided with this configuration, the oil led to the oil filter 42 can more appropriately pass through the adsorption member 44, and then, can flow in the bypass passage 54 or the filtering member 46. In addition, since the intermediate passage region 42c is formed upstream of the filtering member 46, even if the aggregation of the sludge precursor is generated upstream of the filtering member 46, it is possible to more appropriately disperse the sludge precursor into the oil during the engine operating.

As described above, the present invention is explained based upon the above-mentioned embodiments, but for example, the bypass valve 56 is not limited to the above-mentioned configuration. The bypass valve 56 is not necessary to be the electromagnetic drive valve, and may be a valve of a mechanical operating type. For example, when the engine is operating, the bypass valve 56 may be provided with a mechanism that opens with rotation of the crank shaft. In addition, a mechanism that automatically opens/closes according to a pressure of the oil upstream of the filtering member 46 may be provided. It should be noted that it may be not necessarily required to provide the bypass valve 56.

In addition, in the above-mentioned embodiment, two pumps 28 and 52 are provided, but they may be configured as a single pump. In addition, the oil filter 42 may be, as described above, provided in the other location in the oil passage 30.

Figure 5:
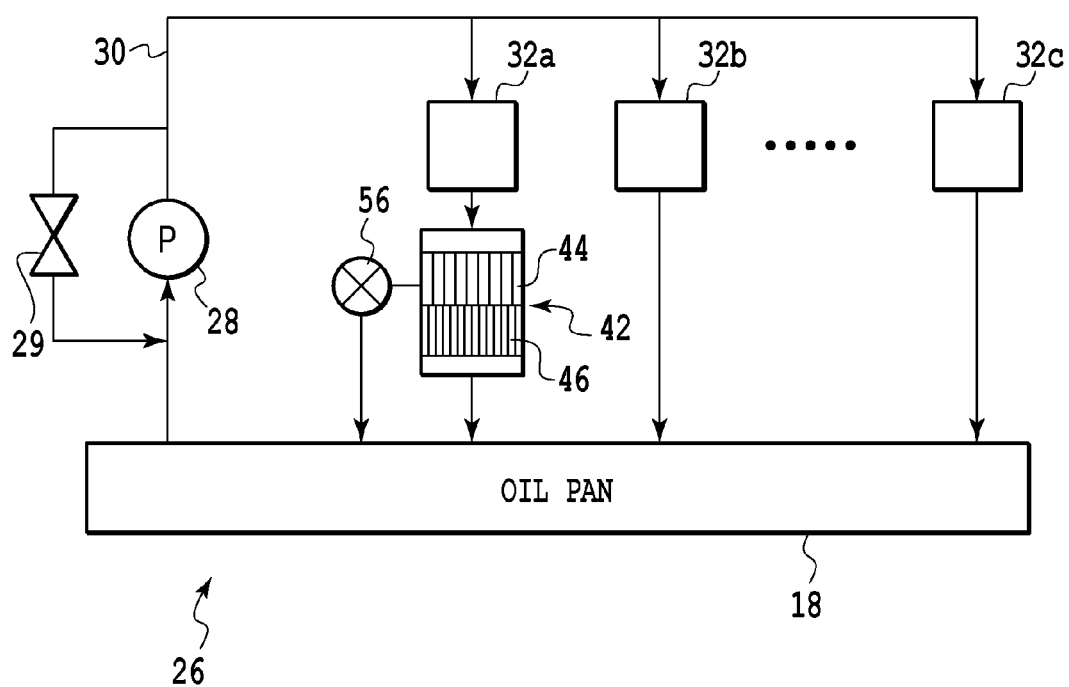
FIG. 5 is a schematic diagram of a lubricating device in an internal combustion engine according to another embodiment in the present invention.

For example, the pump 28 may be provided as a single pump without providing the pump 52. An schematic diagram of a lubricating device for an internal combustion engine according to a different embodiment in the present invention having such a configuration is shown in FIG. 5. In FIG. 5, components corresponding to the above-mentioned components are likewise referred as to codes used in the above-mentioned explanation. In an example in FIG. 5, the oil filter 42 is provided along the way of an oil passage in which oil having passed through a predetermined component 32a flows toward the oil pan 18. The predetermined component 32a may be, for example, a valve train component. It should be noted that components 32a, 32b and 32c and the like in FIG. 5 may be, for example, a cam shaft journal, a crank journal, a connecting rod, and a piston.

In addition, A reaction substance used in the adsorption component in the oil filter is not limited to the hydrotalcite described above. The reaction substance may be a substance that has a function of adsorbing and removing a predetermined component from the oil, for example, an ion-exchange resin. In addition, the reaction substance may be formed only of a substance having a function of trapping, particularly adsorbing acid components, but may include a substance having the other function. Various substances having a function of suppressing the deterioration of the oil may be used as the reaction substance. Specifically various kinds of substances having a function of trapping, for example, adsorbing a predetermined component can be used as the reaction substance to suppress the deterioration of the oil. For example, it is possible to use various kinds of anionic ion-exchange resin or cationic ion-exchange resin as the reaction substance. It should be noted that examples of the ion-exchange resin include an ion-exchange resin of Diaion (registered trademark) series made by Mitsubishi Chemical Co., Ltd and an ion-exchange resin of Amberlite (registered trademark) series made by Rohm and Haas Co., Ltd.

In addition, the reaction substance may be other than the hydrotalcite or the ion-exchange resin. It is possible to use various kinds of reaction substances, such as an inorganic ion-exchanger, a chelate resin, a synthetic adsorbent, and the like.

In addition, the filtering substance used in the filtering component in the oil filter is not limited to the above-mentioned mesoporous silica. The filtering substance may be configured of various substances or objects having a function of trapping the unnecessary product such as the sludge precursor to be removed from the oil. In a case where the filtering component contains a plurality of particulate porous silica, the particulate porous silica may have any number of pores and any size of the bore, and a size of each silica is preferably within the above-mentioned range, but is not limited thereto. A substance other than the silica may be used as the filtering substance. In addition, one or more porous silica membranes can be used as the filtering substance.

It should be noted that in the above-mentioned embodiment, the absorption component and the filtering component are integrally incorporated within one oil filter. However, the absorption component and the filtering component may be configured as a completely independent device. In this case, in a case of using the absorption component and the filtering component to be replaceable, it has an advantage that the absorption component and the filtering component can individually be replaced.

As described above, the present invention is explained based upon the above-mentioned embodiments and its modifications. However, the present invention is not limited to those embodiments and the like, and allows the other embodiment. The present invention includes all modifications and application examples, and its equivalents encompassed in a concept of the present invention defined in claims.

The invention claimed is:

1. An oil deterioration suppressing apparatus for an internal combustion engine comprising:
    an oil reservoir section for reserving oil;
    a filtering component provided in an oil passage through which oil can flow, the filtering component being configured to remove unnecessary products from the oil;
    an adsorption component provided in the oil passage to be positioned upstream of the filtering component, the adsorption component being configured to adsorb a predetermined acid component in the oil;
    a supply device for supplying the oil in the oil reservoir section to a side upstream of the adsorption component and the filtering component;
    a bypass passage formed to bypass the filtering component;
    a bypass valve provided in the bypass passage; and
    a control unit configured to control an operation of the bypass valve;
wherein
    the control unit controls the bypass valve in such a manner that the bypass valve is open during an operation of the internal combustion engine, and controls the bypass valve in such a manner that the bypass valve closes when the internal combustion engine is stopped, and
    the supply device supplies the oil in the oil reservoir section to a side upstream of the adsorption component when the internal combustion engine is stopped.

2. An oil deterioration suppressing apparatus for an internal combustion engine according to claim 1, wherein
    the filtering component and the adsorption component are arranged in a single oil return passage in the oil passage.

3. An oil deterioration suppressing apparatus for an internal combustion engine according to claim 1, wherein
    the filtering component is arranged away from the adsorption component.

4. An oil deterioration suppressing apparatus for an internal combustion engine according to claim 1, wherein
    the filtering component includes a plurality of particulate porous silica.

5. An oil deterioration suppressing apparatus for an internal combustion engine according to claim 1, wherein
    the filtering component includes one or more porous silica membranes.

6. An oil deterioration suppressing apparatus for an internal combustion engine according to claim 1, wherein
    the adsorption component includes one or more ion-exchangers.

7. An oil deterioration suppressing apparatus for an internal combustion engine according to claim 6, wherein
    the adsorption component includes $Mg_6Al_2(OH)(CO_3)_{16}$.

8. An oil deterioration suppressing apparatus for an internal combustion engine according to claim 1, wherein
    an end of the bypass passage is connected to a passage region between the filtering component and the adsorption component.

* * * * *